Inventor
Fritz BONDROIT
By Toulmin & Toulmin
Attys.

United States Patent Office 3,346,266
Patented Oct. 10, 1967

3,346,266
SEALING MEANS FOR FLANGES, ESPECIALLY FOR CYLINDER HEADS
Fritz Bondroit, Burscheid, Germany, assignor to Goetzewerke Friedrich Goetze A.-G., Dusseldorf, Germany
Filed June 15, 1964, Ser. No. 375,110
Claims priority, application Germany, Aug. 16, 1963, G 38,480
1 Claim. (Cl. 277—153)

This invention relates to sealing means for sealing cylinder heads to engine blocks, and in like places where a relatively high pressure is to be sealed.

It is customary to place metallic gaskets and the like between cylinder heads and cylinder blocks to effect the sealing thereof and prevent loss of pressure gases from the cylinder. Metal gaskets are preferable because better sealing is maintained during varying temperature conditions. Even so, the metallic gaskets usually are required to have some elasticity and even under these circumstances, improper sealing many times results under widely varying temperature and pressure conditions.

With the foregoing in mind, it is the primary object of the present invention to provide an improved seal, particularly for sealing a cylinder head to a cylinder block, which will maintain an adequate seal at all times under all conditions.

Another object of this invention is to provide a sealing arrangement for sealing a cylinder head to a cylinder block which will utilize any gas leakage from the cylinder to enhance the effectiveness of the seal.

A still further object of this invention is the provision of a sealing arrangement particularly for placing between a cylinder head and a cylinder block of an engine in which the seal, although being entirely metal, retains sufficient resilience to maintain an adequate seal at all times.

These and other objects will become apparent to those skilled in the art from the following description wherein.

Figure 1:
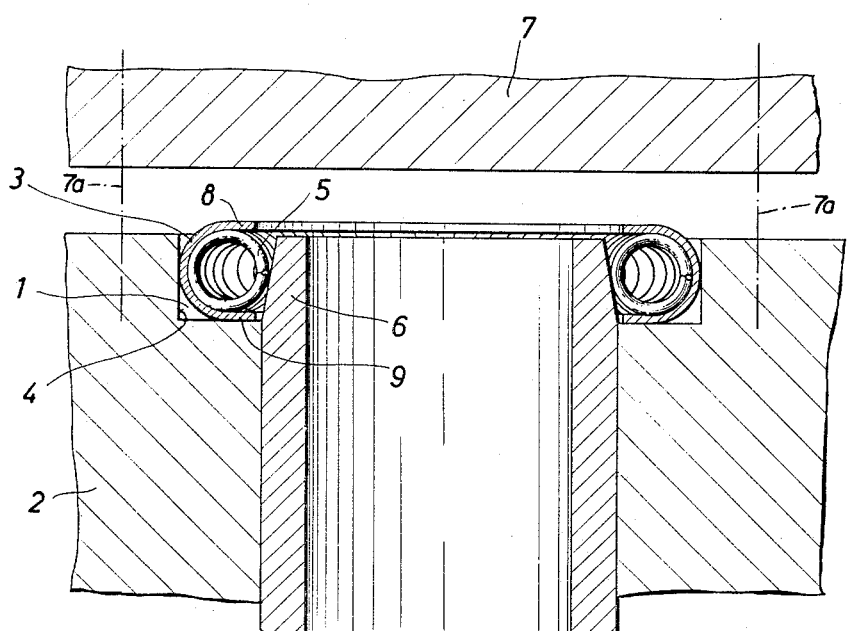
FIGURE 1 is a fragmentary sectional view showing a cylinder block and cylinder liner and cylinder head, with the cylinder head not yet clamped in place, and showing a seal arrangement according to the present invention.

The present invention is characterized in that a metallic gasket or sealing member is employed which is elastic and thereby inherently maintains a good seal between the cylinder head and cylinder block, while furthermore, any leakage of pressure media from the cylinder toward the gasket is employed for enhancing the effectiveness of the gasket.

In brief, a spring, preferably an endless spring is disposed in a channel surrounding the cylinder and disposed around the spring is a metallic strip which forms the gasket element proper, and which is assisted in the performance of its sealing function by the spring. The spring and metallic strip thereabout project from the channel or groove prior to clamping of the head in place so that when the head is clamped in place, the metallic strip and spring are compressed so that they substantially fill the channel and thereby effect the desired sealing.

The metallic strip which is also preferably a complete annulus can advantageously be made of a soft copper, while the endless or tubular coil spring inside the copper gasket strip is relatively hard for being sufficiently resilient to be deformed when the cylinder head is clamped in place. The spring is harder than the copper of the annular gasket strip so that the convolutions of a coil spring will form indentations in the metal strip and will thereby be firmly seated and the spring will not tend to turn when the cylinder head is clamped in place.

The spring is preferably wound so that the convolutions are in face-to-face engagement, and preferably pretensioned whereby the inside of the sealing strip is completely supported while the individual convolutions of the spring will prevent tilting laterally when the head is bolted on the cylinder block.

Referring to the drawings somewhat more in detail, cylinder 2 receives a cylinder liner 6, and at the upper end of cylinder liner 6, cylinder 2 is provided with a shoulder 4 which defines a channel 1 opening upwardly toward the top of the cylinder. Channel 1 receives a cylinder member or gasket according to the present invention, and which consists of the annular strip 3 substantially U-shaped in cross-section, and formed of a material such as soft copper. The strip receives a coil spring 5 which is preferably endless as is strip 3, and spring 5 consists of a plurality of convolutions which are advantageously in face-to-face engagement with each other so that they will have little or no tendency to tilt laterally when cylinder head 7 is bolted down on cylinder block 2.

Figure 2:
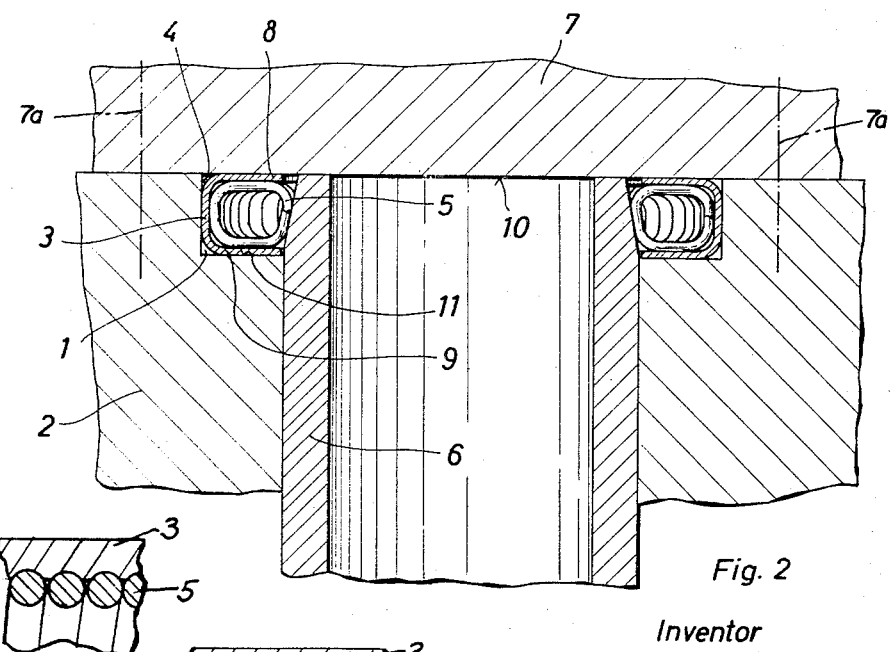
FIGURE 2 shows an assembly after the cylinder head has been clamped in place.
Figure 3:
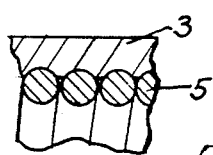
FIGURE 3 is a fragmentary sectional view showing how the coil spring will bite into the metal strip.
Figure 4:
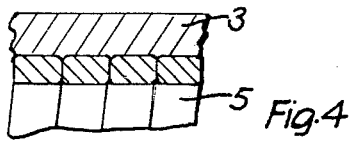
FIGURE 4 is a fragmentary view showing how a spring made of wire with rectangular cross-section will seat on the metal strip.

It will be seen that the sealing strip or gasket extends upwardly beyond the top of the cylinder block and cylinder liner so that when head 7 is bolted in place as by bolts, two of which are indicated by the dashed lines 7a, the gasket will be deformed and take the shape indicated in FIGURE 2.

In FIGURE 2 the legs 8 and 9 of strip 3 have been flattened against the bottom 11 of groove 1 and the underside 10 of cylinder head 7 so that a U-shaped member is formed open toward the region where the end of liner 6 engages the bottom of cylinder head 7. Any leakage of pressure from the cylinder will thus tend to expand legs 8 and 9 and enhance the sealing characteristics thereof. These legs are furthermore continuously urged away from each other by spring 5 so that even under extreme conditions of temperature and mechanical stress of the cylinder block and cylinder head, an adequate seal will be maintained at all times.

The cylinder head 7 is in direct metal-to-metal engagement with liner 6 and cylinder block 2 so that accidental overcompression or undecompression of the sealing gasket is not possible as is the case with conventional cylinder head gaskets which extend completely across the areas of engagement of the cylinder head with the cylinder block.

As mentioned before, the material of annular strip 3 is preferably a soft copper or the like, and the spring 5 is harder than this material so that as cylinder head 7 is brought into position, the convolutions of the spring will bite into the material of the strip and the convolutions will thereby be supported against tilting laterally. The supporting of the spring against tilting is further enhanced by making the spring so that the convolutions are in face-to-face engagement with each other and preferably under prestressed conditions.

The wire from which spring 5 is made can be round, but it is also possible to use square or rectangular wire and in which case the shape of the wire would assist materially in preventing the convolutions from tilting laterally as the cylinder head was pulled down into place.

It has been mentioned that the metal strip 3 is of softer material than spring 5, but it will be evident that suitable results can be made if strip 3 had a core portion of relatively hard material with a softer coating material on one or both sides thereof.

It will be understood that this invention is susceptible to modification in order to adapt it to different usages and conditions and, accordingly, it is desired to comprehend

What is claimed is:

In combination, cylinder block means having a cylinder bore therein, an annular channel in the cylinder block means opening toward the upper end of said cylinder bore, a cylinder liner in said cylinder bore extending over said channel and forming an inner confining wall therefor, a sealing member mounted in said channel and projecting upwardly beyond the top of said channel, said sealing member comprising an annular metal coil spring having convolutions in direct face-to-face engagement with each other and an annular metal strip U-shaped in cross-section, said strip softer than said spring so that said convolutions become embedded in said strip and are thereby prevented from tilting laterally, said strip fitted closely about the outer periphery of said spring and extending radially inwardly toward the center of the cylinder bore at the top and bottom of the spring, said metal strip having an outer diameter substantially equal to the diameter of said channel, and a cylinder head adapted for being bolted to said cylinder block close to the upper end of said cylinder bore and being operable when bolted on the cylinder block for engaging the projecting portion of said sealing member and for deforming said sealing member in said channel so that the sealing member substantially fills the channel and contacts said cylinder liner while said strip is in sealing engagement with the bottom of the channel and the bottom of the cylinder head and forms a substantially U-shaped member opening toward the cylinder bore.

References Cited

UNITED STATES PATENTS 2,939,753   6/1960   Schilling et al. _____ 92—171

FOREIGN PATENTS 735,801   8/1955   Great Britain.

LAVERNE D. GEIGER, *Primary Examiner.*

D. MASSENBERG, *Assistant Examiner.*